Aug. 26, 1930.   E. G. KESLING   1,773,902

SPEED CHANGING MECHANISM

Filed June 16, 1927

INVENTOR
Elmer G. Kesling,
BY
Philip E. Siggers,
ATTORNEY

Patented Aug. 26, 1930

1,773,902

UNITED STATES PATENT OFFICE

ELMER G. KESLING, OF BLOOMFIELD, MISSOURI

SPEED-CHANGING MECHANISM

Application filed June 16, 1927. Serial No. 199,326.

This invention relates to speed changing mechanism for automobiles or other motor vehicles, and aims among other objects to provide improved mechanism of that type which is equally adaptable either to a shifting gear type transmission or a sliding key type transmission.

The present invention may be regarded as an improvement on my co-pending application, Serial No. 135,401, which matured into Patent Number 1,635,484.

Figure 1:
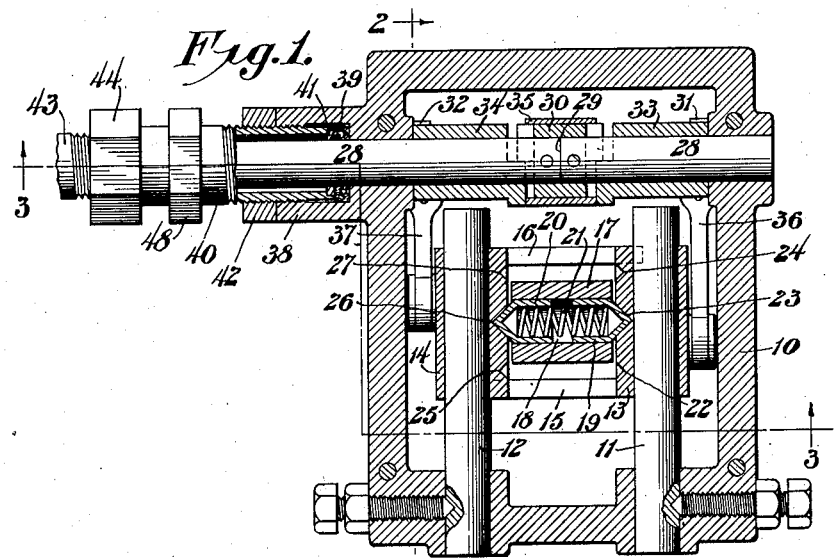
Fig. 1 is a horizontal sectional view through the top of the gear casing cover.
Figure 2:
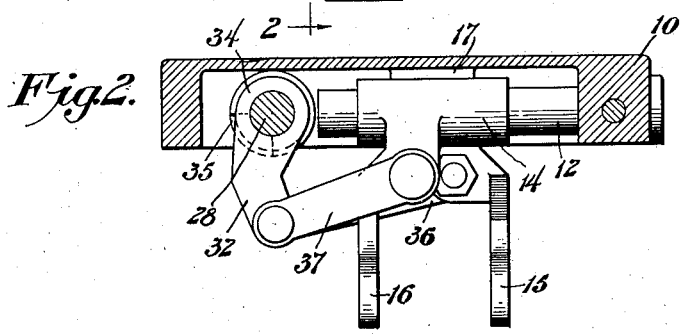
Fig. 2 is a vertical sectional view taken on the line 2—2 of Fig. 1.
Figure 3:
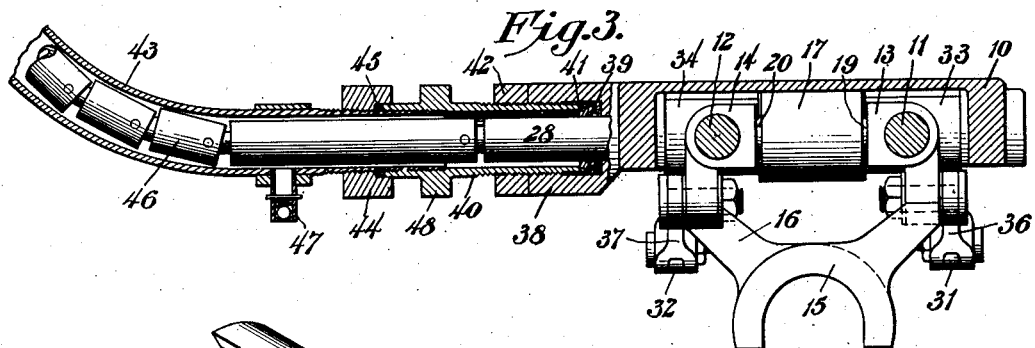
Fig. 3 is a vertical sectional view taken on the line 3—3 of Fig. 1.

Referring particularly to the drawings, the preferred embodiment is shown as comprising a combined selector and shifting shaft mounted for longitudinal and rocking movement in a gear casing cover, and having a clutch member secured thereto adapted to engage clutch members on the hubs of crank levers, which are connected to shifting yokes. There is also provided an improved mounting for the selector and shifting shaft.

Herein there is shown a gear casing cover 10, adapted to be secured to the conventional gear casing (not shown). Within the cover are parallel rods 11 and 12 secured in the present instance in suitable apertures in the rear wall of the cover by set screws or the like. The front ends of the rods are preferably left floating but could also be supported in any desired manner. Slidably mounted on the rods 11 and 12 are sleeves 13 and 14 which may be made integral with or secured to shifting yokes 15 and 16 respectively. Formed on or suitably secured to the cover, is a block 17, which projects downwardly between the sleeves 13 and 14. The block is provided with a horizontal bore 18, which is at right angles to and on a plane with the longitudinal axes of the rods 11 and 12. Herein hollow or thimble-like plungers 19 and 20 are mounted within the bore 18 and are adapted to be urged from each other by a spring 21, and into engagement with notches in the adjacent sides of the sleeves 13 and 14. The notches 22, 23 and 24 in the sleeve 13 correspond to low, neutral and reverse speed positions respectively, and the notches 25, 26 and 27 correspond to intermediate, neutral and high speed positions respectively.

To prevent the possibility of shifting into more than one speed at a time, the neutral notches 23 and 26 are considerably deeper than the notches for the other positions. Herein the neutral notches are directly opposite to each other when the shifting yokes are in neutral position and the adjacent ends of the plungers 19 and 20, when seated in the neutral notches, are spaced apart a distance equal to the depth of one of the neutral notches, therfore only one of the shifting yokes can be moved from neutral position at a time. The plungers and notches also hold the yokes and the gears actuated thereby in the position to which they have been shifted.

Figure 4:
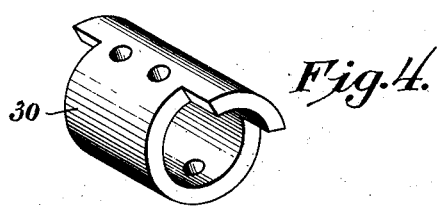
Fig. 4 is a detail perspective view of the clutch.

The selecting and shifting shaft 28, is mounted for longitudinal and rocking movement in suitable bearings in the side walls of the cover 10. For convenience of assembly, the shaft is cut in two as at 29 and the cut ends are inserted into a sleeve 30 and rigidly secured therein by suitable pins. The sleeve 30, as shown in detail in Fig. 4, is of tubular formation and has part of its wall cut away at each end, to form clutch portions.

Mounted for rocking movement on the shaft 28 are crank arms 31 and 32 having elongated hub portions 33 and 34 located at either side of the clutch 30 and spaced therefrom. The adjacent faces of the hubs are cut away to form clutches adapted to coact with the clutch 30.

The outer ends of the hubs 33 and 34 abut the inner sides of the cover 10 and are held so by a spacing ring 35, the ends of which abut the inner ends of the hubs. The ring is loosely supported on the clutch 30 and suitable apertures (not shown) may be provided in its wall for the insertion or removal of the pins which hold the clutch 30 on the shaft 28. The spacing of the hubs 33 and 34 is such that with either limit of endwise movement of the shaft 28 and clutch 30, only one of the hubs will be in clutching relation.

The crank arms 31 and 32 project downwardly into the gear casing (not shown) and their free ends are pivotally connected by links 36 and 37 to the yokes 15 and 16 respectively.

Formed integrally on one side of the cover 10 is a tubular extension 38, the bore of which is concentric with and somewhat larger than the shaft 28 to accommodate a packing ring 39. The extension 38 is also internally screw-threaded to receive the end of a packing adjusting tube 40. A ring or washer 41 is tightly fitted or secured in the end of the tube 40 and is slightly beveled inwardly on the side next to the packing, so as to cause the latter to be compressed against the shaft 28 as well as between the tube 40 and the bottom of the bore. A lock nut 42 is provided to lock the tube 40 in its adjusted position. The other end of the tube 40 is internally screw-threaded to receive the lower end of a rigid tortuous tube 43 which is securely held in place by a nut 44 having a seat therein for a packing washer 45 to make a tight joint.

Mounted for both longitudinal and rocking movement within the tube 43 is a jointed shaft 46 having its lower end connected to the shaft 28. Herein the shaft is formed of a plurality of different lengths of spindles and tubes secured together in end to end relation with pivot pins arranged transversely to the shaft and transverse to each oher. The tube 43 and the shaft 46 may be carried up to the instrument board or steering wheel in a manner shown and described in the above mentioned application.

An alemite connection 47 may be secured in the lower end of the tube 43 if desired in order to fill the tube with heavy oil or other desirable lubricant. The pressure on the packing washer 39 can be adjusted by first loosening the nuts 42 and 44 and then turning the tube 40. To facilitate the turning of the tube 40, a polygonal enlargement 48 may be formed thereon. The threads of both ends of the tube 40 are of the same pitch, so adjustments will not alter the relation of the tube 43 to the cover 10.

In the operation of the mechanism, lateral movement of the shaft 28 to the right will cause the clutch 30 to engage the hub 33 for the selection of low or reverse speeds, whereupon rocking movement of the shaft 28 will shift the yoke 15 through the medium of the crank arm 31 and the link 36; and lateral movement of the shaft 28 to the left will cause the clutch 30 to engage the hub 34 for the selection of intermediate or high speeds, whereupon rocking movement of the shaft 28 will shift the yoke 16 through the medium of the crank arm 32 and the link 37.

When the mechanism is in neutral position, the clutch 30 is partly engaged with both hubs 33 and 34 but cannot be rotated due to the interlocking mechanism between the sleeves 13 and 14.

From the foregoing description it will be apparent that improved mechanism has been provided whereby the yokes will be selectively and positively shifted without undue lost motion and which mechanism may be easily installed for use with any of the present standard transmission gearing without extensive modification.

Obviously the present invention is not restricted to the particular embodiment thereof herein shown and described. Moreover, it is not indispensable that all the features of the invention be used conjointly, since they may be employed advantageously in various combinations and subcombinations.

What is claimed is:—

1. A gear selecting and shifting mechanism comprising in combination; a gear casing cover; shifting mechanism mounted in the cover; a shaft mounted for longitudinal and rocking movement in the cover and arranged to actuate the shifting mechanism; a tubular extension formed on the cover and surrounding the shaft; a jointed shaft connected to the first mentioned shaft; a tubular guide for the jointed shaft; and means for adjustably connecting the guide to the tubular extension.

2. A gear selecting and shifting mechanism comprising a support, shifting mechanism carried by said support, a shaft mounted for longitudinal and rocking movements in said support, arms pivoted on said shaft and operable selectively thereby for operating selected parts of said shifting mechanism, a link pivotally connecting each of said arms with a part of said shifting mechanism, a tubular extension on said support surrounding said shaft, a jointed shaft connected to said first mentioned shaft, a tubular guide for the jointed shaft, and means for adjustably connecting said guide to said tubular extension.

3. A gear selecting and shifting mechanism comprising a support, shifting yokes carried by said support for lateral shifting movements, a shaft mounted for longitudinal and rocking movements in said support at right angles to the axes of movements of said shifting yokes, arms loosely mounted on said shaft, means in connection with said support for holding said arms for movements away from each other, means carried by said shaft preventing movements of said arms toward each other, a device carried by said shaft for selectively rocking said arms with said shaft, and a link pivotally connecting each of said arms with one of said yokes.

4. A gear selecting and shifting mechanism comprising a gear casing cover, a shaft mounted for longitudinal and rocking movements in said cover, a jointed shaft for imparting longitudinal and rocking movements to said first named shaft, a number of yokes supported in said cover for movement in directions toward and away from said first named shaft, a number of arms pivoted on said first named shaft and held from lateral movements away from each other by said cover, a device rigid on said first named shaft for selectively engaging and rotating said arms with said first named shaft, means on said device holding said arms from movements toward each other, and a number of links each of which has one end pivotally connected with a corresponding one of said arms and the opposite end pivotally connected with a corresponding one of said yokes.

5. A gear selecting and shifting mechanism comprising a gear casing cover, a shaft mounted for sliding and rocking movements in said cover, means for imparting longitudinal and rocking movements to said shaft, a number of gear shifting yokes supported by said cover for movements toward and away from said shaft, a number of arms supported by said shaft and corresponding respectively to said yokes, a number of links each of which has one end pivoted to a corresponding one of said arms and the opposite end pivoted to a corresponding one of said yokes, a part in connection with said cover holding said arms from movements in directions away from each other, an element supported by said shaft for holding said arms from movement toward each other, and means supported by said shaft for selectively engaging and operating said arms.

6. A gear selecting and shifting mechanism comprising a support, shifting mechanism carried by said support, a shaft mounted for longitudinal and rocking movements in said support, arms pivoted on said shaft for selective operation, a clutch sleeve attached to said shaft between said arms and being movable by said shaft into engagement with said arms selectively, a ring rotatively mounted on said sleeve and holding said arms in spaced relationship and permitting said shaft to be moved longitudinally through said arms, a link pivotally connecting each of said arms with a part of said shifting mechanism, a jointed shaft connecting with said first mentioned shaft for imparting longitudinal and rocking movements to said first named shaft, and a tubular guide for said jointed shaft.

7. A gear selecting and shifting mechanism comprising a support, shifting mechanism carried by said support, two axially alined separate shaft sections mounted for longitudinal and rocking movements in said support, an arm pivoted on each of said shaft sections, a clutch sleeve mounted on the adjacent ends of said shaft sections, means rigidly securing said sleeve to said shaft sections, means connecting said arms with parts of said shifting mechanism, and means for imparting longitudinal and rocking movements to said shaft sections.

8. A gear selecting and shifting mechanism comprising a support, shifting mechanism carried by said support, two axially alined separate shaft sections mounted for longitudinal and rocking movements in said support, an arm pivoted on each of said shaft sections, a clutch sleeve mounted on the adjacent ends of said shaft sections, means rigidly securing said sleeve to said shaft sections, means connecting said arms with parts of said shifting mechanism, means for imparting longitudinal and rocking movements to said shaft section, and a device mounted on said sleeve for holding said arms in spaced relationship.

9. Mechanism of the character described comprising a shaft supported for longitudinal and rocking movements, yokes supported in approximately the same plane with the shaft for lateral movements in directions toward and away from the shaft, crank arms pivotally supported on the shaft, a clutch device rigid on the shaft for selectively engaging the crank arms to rock the crank arms with the shaft selectively, and links connecting the respective crank arms with corresponding yokes for moving said yokes in directions toward and away from said shaft when said shaft is rocked.

10. Mechanism of the character described comprising a shaft supported for longitudinal and rocking movements, a number of movable yokes, means for supporting said yokes for movements in directions approximately toward and away from the shaft, crank arms pivotally supported on the shaft, a device rigid on the shaft for selectively engaging the crank arms when said shaft is moved longitudinally and for rocking the crank arms with the shaft when the shaft is rocked, a connection for imparting longitudinal and rocking movements to said shaft, and links pivotally connected with the respective crank arms and with corresponding yokes for moving said yokes in directions approximately toward and away from said shaft when said shaft is rocked.

11. A gear selecting and shifting mechanism comprising in combination; a gear casing cover; a spindle mounted for longitudinal and rocking movements in the cover; crank arms loosely mounted on said spindle; a device for holding said crank arms in proper spaced relationship for selective operation; means rigidly mounted on said spindle for selectively engaging said crank arms while said arms are held in said spaced relationship; slidably mounted yokes; and a link connection between each of said crank arms and a corresponding one of said yokes.

12. A gear selecting and shifting mechanism comprising in combination; a gear casing cover; a spindle mounted for longitudinal and rocking movements in said cover; crank arms loosely supported on said spindle and held from outward longitudinal movements by said cover; means rigidly mounted on said spindle between said crank arms and operative thereby to engage and to operate said crank arms selectively; a device mounted between said crank arms and holding the same in spaced relationship for selective engagement and operation by said means; slidably mounted yokes; and links connecting the respective crank arms with said yokes.

13. A gear selecting and shifting mechanism comprising a spindle supported for longitudinal and rocking movements, crank arms loosely supported on said spindle, a clutch element rigid on said spindle and operative thereby to engage and to operate said crank arms selectively, a spacer mounted on said element holding said crank arms in proper spaced relationship for selective engagement and operation by said clutch element, slidably mounted yokes, and a link having one end in permanent pivotal engagement with one of said crank arms and its opposite end in permanent pivotal engagement with a corresponding one of said yokes.

14. A gear selecting and shifting mechanism comprising a spindle supported for longitudinal and rocking movements, crank arms loosely supported on said spindle, a clutch element rigid on said spindle and operative thereby to engage and to operate said crank arms selectively, spacing means for holding said crank arms in proper spaced relationship for engagement and operation by said clutch element, slidably mounted yokes, and links pivotally connecting the free ends of said crank arms with said yokes, respectively.

In testimony that I claim the foregoing as my own, I have hereto affixed my signature.

ELMER G. KESLING.